(12) United States Patent
Tamura et al.

(10) Patent No.: US 6,586,140 B2
(45) Date of Patent: Jul. 1, 2003

(54) POLYMER-ELECTROLYTE LITHIUM SECONDARY BATTERY

(75) Inventors: Noriyuki Tamura, Kyoto (JP); Maruo Kamino, Katano (JP); Shin Fujitani, Hirakata (JP)

(73) Assignee: Sanyo Electric Co., Ltd., Osaka (JP)

( * ) Notice: Subject to any disclaimer, the term of this patent is extended or adjusted under 35 U.S.C. 154(b) by 169 days.

(21) Appl. No.: 09/773,499

(22) Filed: Feb. 2, 2001

(65) Prior Publication Data

US 2002/0122987 A1 Sep. 5, 2002

(30) Foreign Application Priority Data

Feb. 2, 2000 (JP) ........................................ 2000-025156

(51) Int. Cl.[7] .............................................. H01M 6/18
(52) U.S. Cl. ........................ 429/317; 429/94; 429/127; 429/304; 429/309
(58) Field of Search ................................ 429/127, 304, 429/309, 317, 94

(56) References Cited

U.S. PATENT DOCUMENTS 5,616,152 A    4/1997  Velasquez et al. ......... 29/623.5
5,789,106 A  * 8/1998  Rosenmeier et al. ........ 252/62.2
6,235,433 B1 * 5/2001  Amano et al. .............. 252/62.2

FOREIGN PATENT DOCUMENTS

| JP | 11-111337 | 4/1999 | |
| JP | 11-121035 | 4/1999 | |
| JP | 2001-28273 | * 1/2001 | .......... H01M/10/40 |
| WO | WO97/36337 | 10/1997 | |
| WO | WO99/38225 | 7/1999 | |

* cited by examiner

*Primary Examiner*—Carol Chaney
*Assistant Examiner*—Dah-Wei Yuan
(74) *Attorney, Agent, or Firm*—Kubovcik & Kubovcik

(57) ABSTRACT

The present invention provides a lithium polymer secondary battery having at least a basic battery cell including a positive electrode, a negative electrode and a polymer electrolyte in an outer can, wherein the battery has a suitable structure to use the polymer electrolyte polymerized in the battery and has excellent cycle characteristics. One of the electrodes is U-shaped and the other electrode is inserted in the U-shaped electrode. The polymer electrolyte includes a polymer containing a polyalkylene oxide structure and a solvent and is polymerized in the battery. The thickness of the battery is not greater than 2 mm.

25 Claims, 3 Drawing Sheets

POLYMER-ELECTROLYTE LITHIUM SECONDARY BATTERY

FIELD OF THE INVENTION

The present invention relates to a polymer-electrolyte lithium secondary battery (lithium polymer secondary battery). Furthermore the invention relates a lithium polymer secondary battery containing a polymer electrolyte polymerized in the battery.

BACKGROUND OF THE INVENTION

Development of a miniature, light and repeatedly chargeable secondary battery having high energy density has lately been desired with development of electronic equipment. A lithium secondary battery has gained attention because it is safe, and has high energy density per volume or per weight and a long life time. As a lithium ion secondary battery, one containing liquid electrolyte has been practiced. However, a lithium polymer secondary battery having a gel polymer electrolyte is gaining attention as a future lithium secondary battery.

It has been known that a lithium polymer secondary battery is prepared by insertion of a polymer sheet between a positive and negative electrodes and gelling of the polymer.

However, electrodes and polymer electrolyte in a conventional lithium polymer secondary battery do not adhere well because of the manufacturing processes of the polymer electrolyte and the structure of the battery. There are also problems that the battery has high battery structural pressure (pressure inside of the battery), varied temperature distribution in the battery during charge and discharge, and bad heat radiation. Therefore, the active materials of the battery easily deteriorate and the battery does not have good cycle characteristics.

A lithium polymer secondary battery having a polymer electrolyte that is obtained by polymerization in a battery is also known. However, it is difficult for a monomer for the polymer electrolyte to penetrate into a fine porous film located between a positive and negative electrode stuctrure that is formed by insertion of a fine porous film between positive and negative electrodes which are wound into a spiral and then pressed to a flat plate. There is also difficulty in providing good adherence between the polymer electrolyte and electrodes.

OBJECT OF THE INVENTION

An object of the present invention is to provide a lithium polymer secondary battery which has a suitable structure to use a polymer electrolyte polymerized in a battery and has good cycle characteristics.

SUMMARY OF THE INVENTION

The present invention provides a lithium polymer secondary battery having at least a basic battery cell including positive and electrodes and a polymer electrolyte in an outer can, wherein one of the electrodes is U-shaped and the other electrode is inserted in the U-shaped electrode and the polymer electrolyte includes a polymer containing polyalkylene oxide and a solvent and is polymerized in the battery. The thickness of the battery is not greater than 2 mm.

Figure 1:
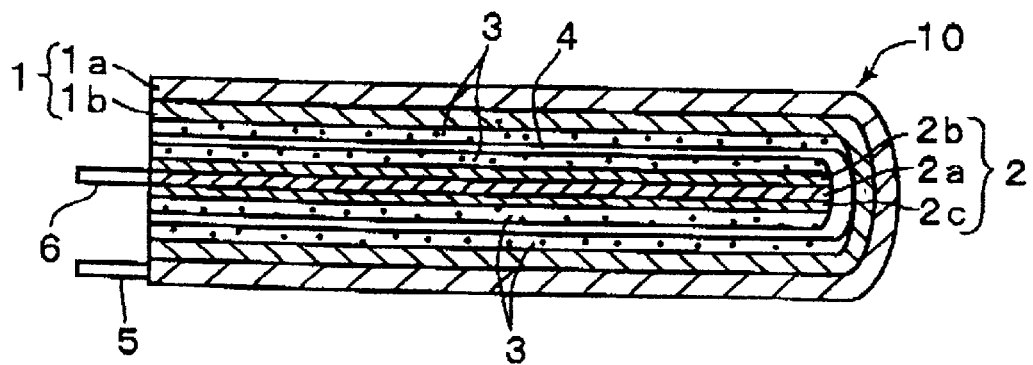
FIG. 1 is a cross section of the structure of a basic battery cell of the present invention.

The following elements are shown in the drawing:
1: a negative electrode (U-shape electrode)
1$a$: a negative electrode collector
1$b$: a layer of a negative electrode active material
2: a positive electrode
2$a$: a positive electrode collector
2$b$, 2$c$: a layer of a positive electrode active material
3: a polymer electrolyte
4: a fine porous film
5: a negative electrode tab
6: a positive electrode tab
10, 20: a basic battery cell
30: a outer can
40: a lithium polymer secondary battery

DETAILED DESCRIPTION OF THE INVENTION

In a lithium polymer secondary battery of the present invention, as described above, at least one basic battery cell is stored in an outer can. One of the electrodes is U-shaped, and the other electrode is inserted inside of the U-shaped electrode. Therefore, three directions except for the bent portion of the U-shaped electrode are open. This structure makes it easy for a monomer which forms a polymer electrolyte to permeate into spaces between the electrodes and to make it possible to increase adhesion between the polymer electrolyte obtained by polymerization and the electrodes. Gas created during charge and discharge cycles over a long period is easily released and is unlikely to stay between the electrodes because of the openings in three directions. Cycle characteristics are improved.

A conventional battery structure, i.e., a separator sandwiched by electrodes and wound like a spiral and pressed to make a flat plate, has openings in only two directions that are perpendicular to the direction of winding. A monomer for forming a polymer electrolyte is difficult to permeate into spaces between electrodes. Gas created during charge and discharge cycles is not as easy to be released in as the basic battery cell of the present invention. It is also a problem that a separator tends to shift when the separator is inserted between electrodes and is wound together and can cause a short in a battery by expansion and shrinkage of an active material that occurrs during charge and discharge cycles. Mechanical stress created by expansion and shrinkage of an active material during charge and discharge cycles tends to concentrate in the electrodes because the electrodes having a conventional structure have a lot of bent portions. This causes a decline in cycle characteristics. A basic battery cell of the present invention has only one bent portion and there are not many portions where mechanical stress created by expansion and shrinkage of an active material during charge and discharge cycles concentrates. Therefore, a battery of the present invention has improved cycle characteristics.

The preferable thickness of the battery of the present invention is not greater than 2 mm. If the thickness is greater than 2 mm, distribution of temperature in the battery varies widely during charge and discharge and diffusion of heat in the direction of the thickness of the battery becomes worse and then the cycle characteristics of the battery deteriorate. On the other hand, according to the present invention, it is possible for the thickness to be not greater than 2 mm, and to make a lithium polymer battery thinner. The basic battery cells can be layered and placed in an outer can. It is preferable to layer the basic battery cells such that the outside of the U-shaped electrode of each basic battery cell is adjacent to the outside of another U-shaped electrode.

It is preferable that a ratio (discharge capacity/electrode overlaping area) of the discharge capacity of a battery versus the overlapping area of the positive electrode and negative electrode of a basic battery cell (electrode overlaping area)is not greater than 0.15 mAh/mm$^2$. The electrode overlaping area means the area where the positive electrode and the negative electrode overlap each other when the basic battery cell is viewed from above the unit. Such a ratio makes it possible to improve cycle characteristics because battery structure pressure is reduced and the area for radiation of heat is increased.

Figure 4:
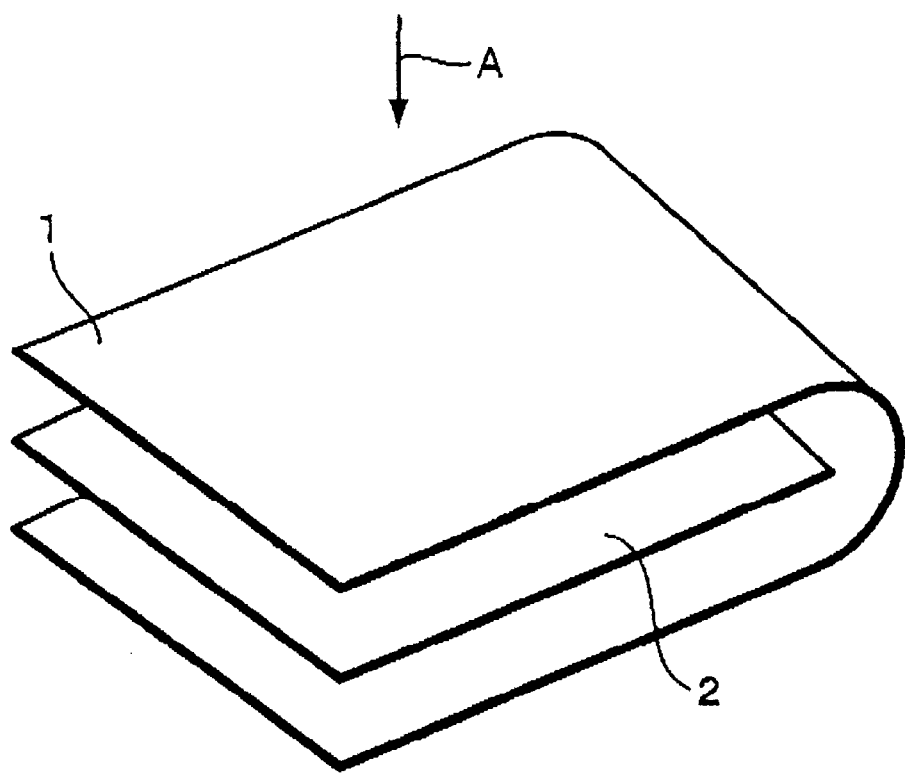
FIG. 4 is a perspective view to explain the electrode overlapping area of the present invention.
Figure 5:
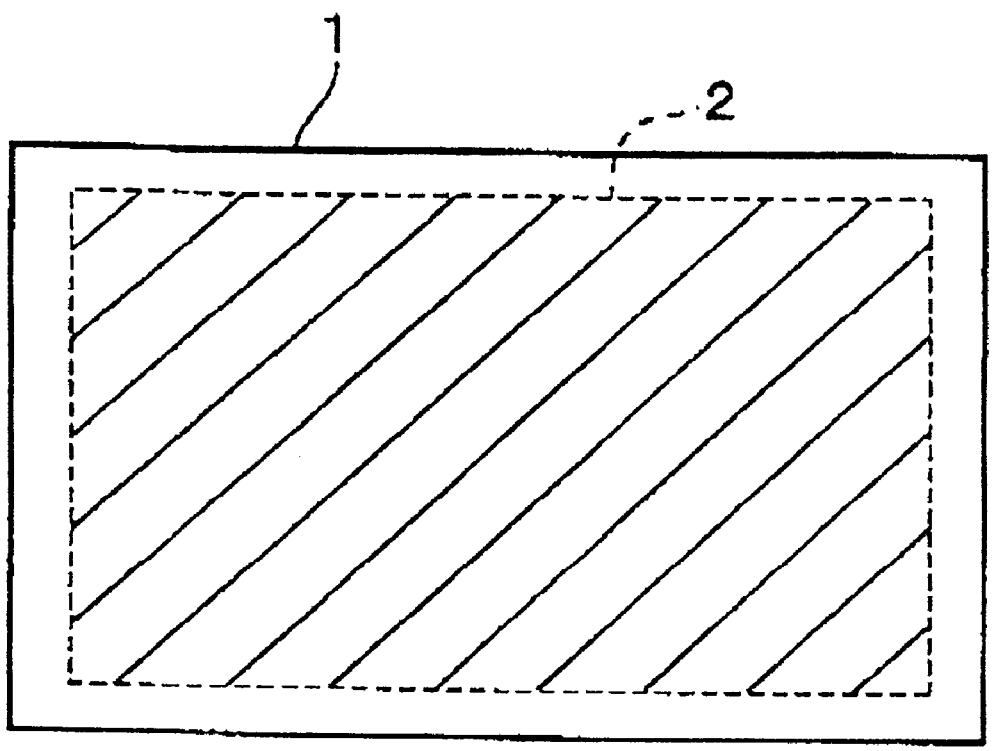
FIG. 5 is a plan view to explain the electrode overlapping area of the present invention.

FIGS. 4 and 5 illustrate the electrode overlaping area of the present invention. FIG. 4 is a perspective view and FIG. 5 is a plan view. As shown in FIG. 4, a negative electrode 1 is a U-shaped electrode and a positive electrode 2 is inserted in the opening of U. FIG. 5 is a view from above the basic battery cell, i.e., in the direction of "A" as shown in FIG. 4. The overlapped area of the negative electrode 1 and the positive electrode 2, i.e., the hatched area as shown in FIG. 5, is the electrode overlaping area of the present invention. Edges of the positive electrode 2 are inside the edges of the negative electrode 1 in the example shown in FIG. 5 so that the area of the positive electrode 2 is the electrode overlaping area.

As explained above, the ratio of discharge capacity/electrode overlaping area of the present invention should not be greater than 0.15 MAh/mm$^2$. When the ratio of discharge capacity/electrode overlaping area is within this ratio, cycle characteristics of a battery are better.

The polymer electrolyte to be used in the present invention is a combination of polymer having a polyalkylene oxide structure and a solvent, and is polymerized in the battery. The monomer polymerized in the battery is not specifically limited. A polyethylene oxide chain, polypropylene oxide chain, or an acrylate monomer having these chains are illustrated. More particularly, polyethylene glycol methacrylate, polyethylene glycol acrylate and polyethylene diacrylate and the like are mentioned. The molecular weight of the monomer is not specifically limited. However, a monomer having a molecular weight of less than 500 is preferred. The monomer can be polymerized with an initiator, for example, t-butyl peroxyoctoate, benzophenone, methyl orthobenzoylbenzoate, benzoyl peroxide, azobisisobutyronitrile, and the like. There is no limitation of the amount of the initiator, but it can be about 5000 ppm.

A solute added to the polymer electrolyte of the present invention is not limited. There can be used, for example, lithium trifluoromethanesulfonate (LiCF$_3$SO$_3$), lithium hexafluorophosphate (LiPF$_6$), lithium tetraf luoroborate (LiBF$_4$), lithium perchlorate (LiClO$_4$), and the like.

The polymer electrolyte of the present invention includes solvent. The monomer and solute described above are added to the solvent, and are polymerized. There is no limitation of the solvent. Propylene carbonate, ethylene carbonate, γ-butyrolactone, butylene carbonate, 1,2-dimethoxy ethane, dimethyl carbonate, diethyl carbonate, and the like can be used. It is preferred that the solvent includes a five or six-membered heterocyclic compound containing at least oxygen, sulfur or nitrogen as a member element of a ring. The heterocyclic compound helps to increase ion conductivity in the electrolyte, and to form a stable and good quality coating on the surface of an electrode. The coating of the surface of the electrode improves charge and discharge loading and cycle characteristics. As a heterocyclic compound, 1,3-propanesultone, sulfolane, butadiene sulfone, vinylene carbonate, isoxazole, N-methyl morpholine, N-methyl-2-pyrrolidone and the like can be illustrated.

A fine porous film can be placed between the positive electrode and the negative electrode of a basic battery cell. The fine porous functions as a separator to avoid contact between the positive electrode and the negative electrode when the basic battery cell is assembled. The fine porous film is not limited. For example, a film comprising polyethylene and the like can be used. A porous film including at least a layer comprising polypropylene is specifically preferable. A lithium polymer secondary battery of the present invention has low battery structural pressure, and when the battery is exposed to a high temperature, i.e., higher than 100° C., shrinkage of the fine porous film is greater and a short in the battery may occur. However, shrinkage of the fine porous film can be decreased by using a fine porous film including a polypropyrene layer, and shorts in the battery can be inhibited.

There are no limitations with respect to a positive electrode active material for use in the present invention. It is possible to use a material which has been used or has been proposed for a positive electrode active material. For example, a metal oxide that includes at least one element of manganese, cobalt, nickel, vanadium and niobium, can be used.

There are no limitations with respect to a negative electrode material for use in the present invention. It is possible to use a material which has been used or has been proposed for a negative electrode active material. For example, lithium metal, an alloy which can occlude or release lithium ion, metal oxides, carbon materials, and the like can be used. As an alloy, a lithium alloy, for example, Li—Al alloy, Li—In alloy, Li—Sn alloy, Li—Pb alloy, Li—Bi alloy, Li—Ga alloy, Li—Sr alloy, Li—Si alloy, Li—Zn alloy, Li—Cd alloy, Li—Ca alloy, Li—Ba alloy, and the like can be illustrated. As a metal oxide, Fe$_2$O$_3$, TiO$_2$, Nb$_2$O$_3$, WO$_3$, and the like can be illustrated. As a carbon material, for example, natural graphite, artificial graphite, amorphous carbon, and the like can be illustrated.

PREFERRED EMBODIMENTS

The present invention is explained in detail in conjunction with the following examples. The present invention is not limited by the following examples. It is possible to make various modifications within the scope of the present invention.

Experiment 1

The overlapped area of electrodes and thickness of a lithium polymer secondary battery of the present invention were varied to evaluate the effect on cycle characteristics.

Preparation of Positive Electrode 85 weight % of LiCoO$_2$ powder having average particle diameter of 10 μm, 10 weight % of carbon powder as a conductive agent and 5 weight % of polyfluorovinylidene powder as an binding agent were mixed, and N-methylpyrrolidone was mixed to prepare a slurry. The slurry was coated on both sides of an aluminum electrode collector having a thickness of 20 μm by a doctorblade method. Thicknesses of the coatings are about 60 μm and about 75 μm. The coated electrode collector were dried at 120° C., and cut to a predetermined size to prepare positive electrodes.

Preparation of Negative Electrode 95 weight % of natural graphite having an average particle diameter of 20 μm and 5 weight % of polyfluorovinylidene powder as a binding agent were mixed, and N-methylpyrrolidone was mixed to prepare a slurry. The slurry was coated on one side of a copper electrode collector having a thickness of 20 μm by a doctorblade method. Thicknesses of the coatings are about 55 μm and about 70 μm. The coated electrode collectors were dried at 150° C., and cut to a predetermined size to prepare negative electrodes.

Preparation of Polymerization Solution for Polymer Electrolyte

A solution to prepare a polymer electrolyte by polymerization was prepared as follows:

$LiPF_6$ was dissolved into a mixture of ethylene carbonate and diethyl carbonate (1:1) to prepare a solution of 1 mol/l $LiPF_6$. An acrylate monomer, polyethyleneglycol methacrylate (molecular weight 360, Aldrich Co.) was added to form a weight ratio of 5:1, and t-butyl peroxyoctoate was added as an initiator in an amount of 5000 ppm to prepare a polymerization solution.

Preparation of Lithium Polymer Secondary Battery

A polyethylene fine porous film was placed on a layer of the negative electrode active material of the negative electrode, and the laminate was bent into a U-shape with the negative electrode active material layer in the inside. The positive electrode was inserted into the opening of the U-shape to prepare a basic battery cell structure. Then the battery unit was placed in a battery can and the polymerization solution prepared above was poured into the can. After the can was sealed, it was heated at 60° C. for 5 hours to polymerize the monomer in the polymerization solution, and to form a polymer electrolyte.

Batteries having a positive and negative electrode with thicknesses of active material and sizes as shown in Table 1 were prepared. Each battery has the number of basic battery cells shown in Table 1. The overlapping area of each battery is also shown in Table 1. A series batteries and D series batteries were designed to have almost the same discharge capacity. B series batteries and C series batteries were designed to have a certain overlapping area.

TABLE 1

| Battery | | Thickness of Positive Electrode Coating | Size of Positive Electrode (length × width: mm) | Thickness of Negative Electrode Coating | Size of Negative Electrode (length × width: mm) | Electrode overlapping area (mm²) | Number of Basic battery cell(s) |
|---|---|---|---|---|---|---|---|
| A | A1 | 60 μm | 98 × 48 | 55 μm | 200 × 60 | 4704 | 1 |
| Constant | A2 | | 69 × 34 | | 142 × 36 | 2346 | 2 |
| Discharge | A3 | | 58 × 27 | | 120 × 29 | 1566 | 3 |
| Volume | A4 | | 49 × 24 | | 102 × 26 | 1176 | 4 |
| | A5 | | 45 × 21 | | 94 × 23 | 945 | 5 |
| B | B1 | 60 μm | 98 × 48 | 55 μm | 200 × 50 | 4704 | 1 |
| Constant | B2 | | | | | | 2 |
| Area | B3 | | | | | | 3 |
| | B4 | | | | | | 4 |
| | B5 | | | | | | 5 |
| C | C1 | 75 μm | 198 × 148 | 70 μm | 400 × 150 | 29304 | 1 |
| Constant | C2 | | | | | | 2 |
| Area | C3 | | | | | | 3 |
| | C4 | | | | | | 4 |
| D | D1 | 75 μm | 198 × 148 | 70 μm | 400 × 150 | 29304 | 1 |
| Constant | D2 | | 174 × 84 | | 352 × 86 | 14616 | 2 |
| Discharge | D3 | | 142 × 69 | | 288 × 71 | 9798 | 3 |
| Volume | D4 | | 122 × 60 | | 248 × 62 | 7320 | 4 |

Figure 2:
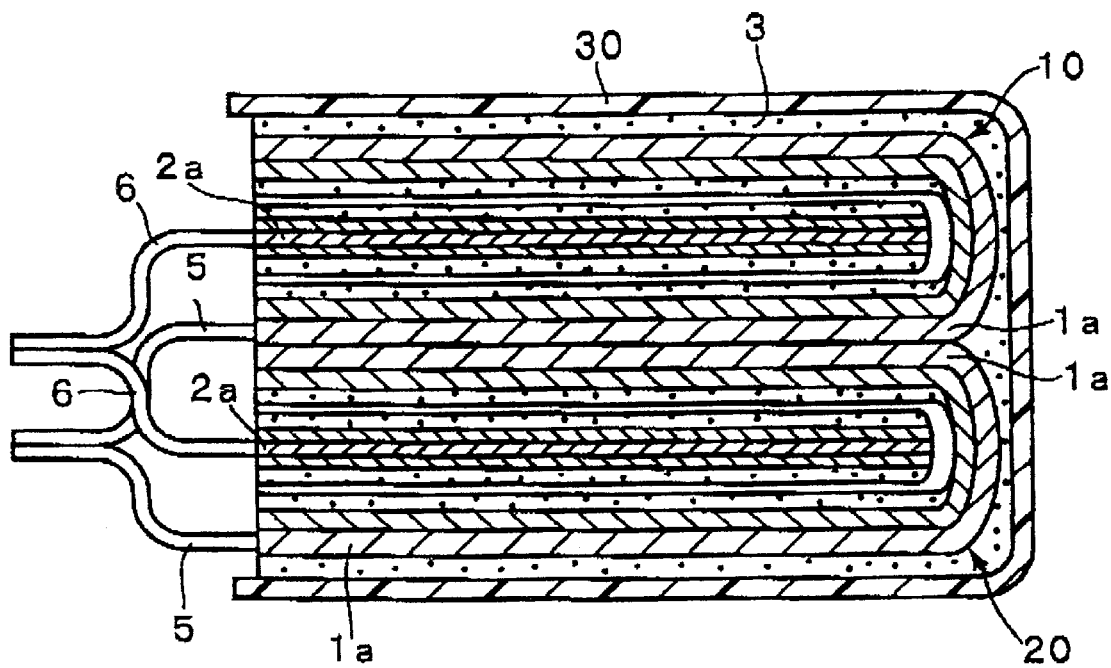
FIG. 2 is a cross section of an embodiment of a lithium polymer secondary battery of the present invention.

FIGS. 1 and 2 are cross sections showing a structure of the prepared lithium polymer secondary battery. FIG. 1 shows a structure of a basic battery cell, and FIG. 2 shows a lithium polymer battery prepared with two basic battery cells stacked in a can.

As shown in FIG. 1, a positive electrode 2 is inserted in a U-shaped negative electrode 1 in a basic battery cell 10. A negative electrode active material layer 1b is inside of a negative electrode collector 1a of the negative electrode 1. A polymer electrolyte 3 and a fine porous film 4 are inside of the negative electrode active material 1b. A positive electrode 2 is placed inside of the polymer electrolyte 3. A polymerization solution is permeated into the inside of the fine porous film 4, and is polymerized to form the polymer electrolyte. Therefore, polymer electrolyte 3 exists inside of the fine porous film 4.

A positive electrode active material layer 2b and 2c are formed on both sides of a positive electrode collector 2a of the positive electrode 2. A negative electrode tab 5 is provided at a terminal of the negative electrode collector 1a, and a positive electrode tab 6 is provided at a terminal of the positive electrode collector 2a.

FIG. 2 is a cross section of a lithium polymer secondary battery having two basic battery cells as shown in FIG. 1 stacked in an outer can. Basic battery cells 10 and 20 having a structure as shown in FIG. 1 are layered as shown in FIG. 2 in an aluminum laminated outer can 30. Basic battery cells 10 and 20 are stacked with the negative electrode collectors 1a each facing the outside. A polymer electrolyte 3 is filled between basic battery cells 10 and 20 and the outer can 30. The polymer electrolyte 3 existing between basic battery cells 10 and 20 and the outer can 30 does not contribute to the function as a secondary battery. It is formed because the polymerization solution extends there when it is injected into the outer can 30.

A positive electrode tab 6 connected to positive electrode collector 2a on basic battery cell 10 and a positive electrode tab 6 connected to positive electrode collector 2a on basic battery cell 20 are connected to each other to form a tab as shown in FIG. 2. A negative electrode tab 5 connected to negative electrode collector 1a on basic battery cell 10 and a negative electrode tab 5 connected to negative electrode collector 1a on a basic battery cell 20 are connected to each other to form a tab in the same way. This make it possible to take out chemical energy created by basic battery cells 10 and 20 as electric energy.

FIG. 2 shows a secondary battery that has two basic battery cells. When a battery has more than three basic battery cells, more than three basic battery cells are stacked in a can in the same manner, and a positive or negative electrode tab of each basic battery cell is connected together to create a tab.

Figure 3:
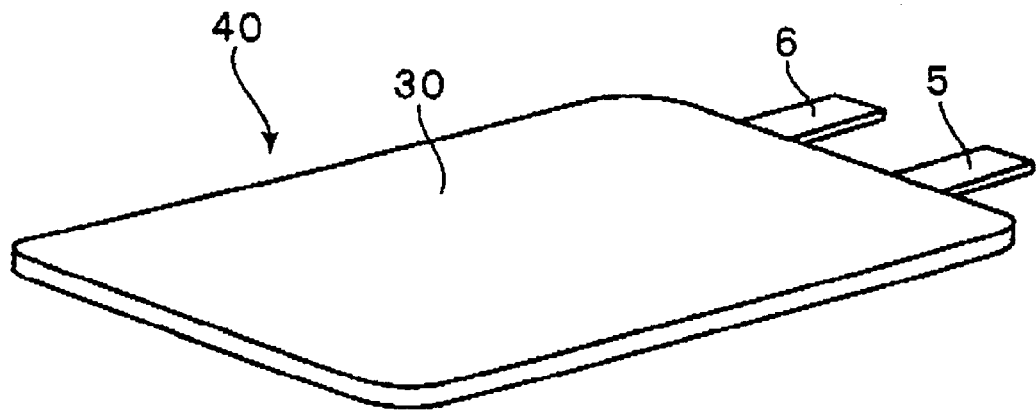
FIG. 3 is a perspective view of the exterior of an embodiment of a lithium polymer secondary battery of the present invention.

FIG. 3 is a perspective view of a polymer secondary battery having an inside structure as explained above. A lithium polymer secondary battery 40 is covered by an outer can 30, and a negative electrode tab 5 and a positive electrode tab 6 are brought out from the outer can 30 as shown in FIG. 3.

Measure of Cycle Characteristics

The batteries prepared as described above were charged to 4.1 V at 0.2 C at 25° C., and then were discharged to 2.75 V at 0.2 C (this is considered a cycle), for two cycles. 0.2 C means that, for example, when a designed capacity for battery A1 is 80 mAh, 80 mA is equivalent to 1 C, therefore, 0.2 C is 016 mA.

Then each battery was charged to 4.1 V at 0.2 C at 25° C., and then was discharged to 2.75 V at 1 C (this is considered a cycle). 50 cycles were repeated. Cycle efficiency (%) was calculated by the equation shown below. Cycle characteristics in the examples described later were also evaluated in the same way. Cycle characteristics of each battery are shown in Table 2. Discharge capacity at the second cycle at 0.2C and at 25° C., a ratio of the discharge capacity and electrode overlapping area (discharge capacity/electrode overlapping area) and thickness of a battery are also shown in Table 2. An average discharge voltage of each battery was about 3.6 V.

Cycle efficiency (%)=(Discharge capacity at 1 C at the 50th cycle/ Discharge capacity at 1 C at the first cycle)×100

TABLE 2

| Battery | Discharge Capacity (mAh) | Discharge Capacity/ Electrode Overlapping Area (mAh/mm$^2$) | Thickness of Battery (mm) | Cycle Characteristics (%) |
| --- | --- | --- | --- | --- |
| A1 | 137 | 0.03 | 0.59 | 79 |
| A2 | 139 | 0.06 | 0.99 | 77 |
| A3 | 142 | 0.09 | 1.38 | 76 |
| A4 | 142 | 0.12 | 1.78 | 73 |
| A5 (Comparative) | 141 | 0.15 | 2.17 | 58 |
| B1 | 137 | 0.03 | 0.59 | 79 |
| B2 | 280 | 0.06 | 1.01 | 78 |
| B3 | 423 | 0.09 | 1.39 | 78 |
| B4 | 564 | 0.12 | 1.78 | 75 |
| B5 (Comparative) | 705 | 0.15 | 2.17 | 59 |
| C1 | 1145 | 0.04 | 0.65 | 75 |
| C2 | 2290 | 0.08 | 1.10 | 74 |
| C3 | 3459 | 0.12 | 1.55 | 71 |
| C4 | 4620 | 0.16 | 1.99 | 66 |
| D1 | 1138 | 0.04 | 0.65 | 75 |
| D2 | 1139 | 0.08 | 1.09 | 72 |
| D3 | 1187 | 0.12 | 1.55 | 70 |
| D4 | 1155 | 0.16 | 1.99 | 65 |

As is clear from the results shown in Table 2, batteries of the present invention (A1~A4, B1~B4, C1~C4 and D1~D4) have better cycle characteristics as compared to comparative batteries (A5 and B5). When discharge capacity/electrode overlapping area is not greater than 0.15 mAh/mm$^2$, a battery has especially excellent cycle characteristics.

Experiment 2

Effects of different polymer electrolytes with respect to cycle characteristics were studied.

Preparation 1 of Polymer Electrolyte

Polyfluorovinylidene (molecular weight 300,000) was dissolved in acetone, and was poured on a Teflon sheet and was dried to prepare a polymer film having a thickness of 100 μm. LiPF$_6$ was dissolved into a mixture of ethylene carbonate and diethyl carbonate (1:1) to prepare an electrolyte of 1 mol/l LiPF$_6$. The electrolyte penetrated the polymer film until it became saturated to prepare a gel polymer electrolyte.

Preparation 2 of Polymer Electrolyte

Copolymer oligomer (molecular weight 700) of 1:1 of acrylonitrile and styrene was added to the electrolyte of LiPF$_6$ dissolved into a mixture of ethylene carbonate and diethyl carbonate (1:1) in an amount of 1 mol/l LiPF$_6$, and was dissolved to provide a weight ratio of 5:1. An initiator, t-butyl peroxyoctoate was added in an amount of 5000 ppm to prepare a polymerization solution.

Preparation of Lithium Polymer Secondary Battery

Gel polymer electrolyte prepared as "Preparation 1 of Polymer Electrolyte" above was used instead of a fine porous film and was inserted between a positive electrode and a negative electrode to prepare a basic battery cell. Three basic battery cells were stacked together, and were placed in an outer can to prepare a comparative battery (E1). Polymerization of a monomer at 60° C. for 5 hours was not conducted. The same positive and negative electrodes used for battery B3 in Experiment 1 were used.

A comparative battery E2 was prepared in the same manner as battery B3 in Experiment 1 except that the polymerization solution prepared in "Preparation 2 of Polymer electrolyte" was used.

Evaluation of Cycle Characteristics

The cycle characteristics of comparative batteries E1 and E2 were evaluated in the same manner as Experiment 1. The results are shown in Table 3. The results of battery B3 of the present invention are also shown.

TABLE 3

| Battery | Polymer Electrolyte | Cycle Characteristics (%) |
|---|---|---|
| B3 (Present Invention) | Polyacrylate (Polymerized in a battery) | 78 |
| E1 (Comparative) | Polyfluorovinylidene | 61 |
| E2 (Comparative) | Acrylonitrile and styrene copolymer (Polymerized in a battery) | 66 |

Battery B3 of the present invention has better cycle characteristics as compared to comparative batteries E1 and E2 as clearly shown by the results in Table 3. A polymer electrolyte including a polymer having a polyalkyleneoxide structure and a solvent and polymerized in a battery is preferable.

Experiment 3

Various heterocyclic compounds were added to a polymer electrolyte to evaluate the effect on cycle characteristics.

Preparation of Polymerization Solution for Polymer Electrolyte 1,3-propanesultone, sulfolane, butadiene sulfone, vinylene carbonate, isoxazole, N-methyl morpholine or N-methyl-2-pyrrolidone was added to the polymerization solution for the polymer electrolyte prepared in Experiment 1 in an amount of 1 weight % to prepare a polymerization solution.

Preparation of Lithium Polymer Secondary Battery

Lithium polymer secondary batteries F1~F7 were prepared in the same manner as battery B3 in Experiment 1 except that the polymerization solution prepared above was used. The additive in the polymerization solution for each battery is shown in Table 4. The result of battery B3 is also shown in Table 4.

TABLE 4

| Battery | Additive | Cycle Characteristics (%) |
|---|---|---|
| F1 | 1,3-Propanesultone | 82 |
| F2 | Sulfolane | 82 |
| F3 | Butadiene sulfone | 86 |
| F4 | Vinylene carbonate | 87 |
| F5 | Isoxazole | 85 |
| F6 | N-methyl morpholine | 83 |
| F7 | N-methyl-2-pyrrolidone | 82 |
| B3 | None | 78 |

Batteries F1~F7 have better cycle characteristics compared to battery B3 as clearly shown by the results in Table 4. A solution of polymer electrolyte preferably contains a five or six-membered heterocyclic compound having at least oxygen, sulfur or nitrogen as a ring member.

Experiment 4

Various fine porous films placed in a basic battery cell were used to study the effect on cyclic characteristics of a battery.

Preparation of Lithium Polymer Secondary Battery

Battery G1 was prepared in the same manner as battery B3 in Experiment 1 except that polypropylene fine porous film was used. Battery G2 was prepared in the same manner as battery B3 in Experiment 1 except that a two-layer fine porous film of polyethylene and polypropylene was used.

Evaluation of Cycle Characteristics

The cycle characteristics of batteries G1 and G2 were evaluated in the same manner as Experiment 1. The results are shown in Table 5.

Evaluation of Thermal Characteristics

Batteries G1, G2 and B3 were left at 120° C. for 10 minutes to evaluate shorts in the battery. The results are also shown in Table 5.

TABLE 5

| Battery | Cycle characteristics (%) | Thermal characteristics |
|---|---|---|
| B3 | 78 | Short occurred in battery |
| G1 | 77 | No problem |
| G2 | 76 | No problem |

Batteries G1 and G2 have similar cycle characteristics to battery B3 as shown in Table 5. Regarding thermal characteristics, batteries G1 and G2 did not have any problem but battery B3 had a short in the battery. Therefore, a fine porous film containing a layer of polypropylene is preferable.

In the above examples, the negative electrode is U-shaped, and the positive electrode is inserted in the U-shaped negative electrode. The present invention is not limited to this embodiment. The positive electrode can be U-shaped and the negative electrode can be inserted in the U-shaped positive electrode.

ADVANTAGE OF THE INVENTION

A lithium polymer secondary battery has a suitable structure to use a polymer electrolyte that is polymerized in the battery, and has excellent cycle characteristics.

What is claimed is:

1. A lithium polymer secondary battery comprising at least one basic battery cell housed in a can, said basic battery cell comprising a positive electrode, a negative electrode and a polymer electrolyte formed between said positive electrode and said negative electrode, wherein one of said positive or negative electrode is U-shaped, and other electrode is inserted in said U-shaped electrode, said polymer electrolyte contains a polymer having a polyalkyleneoxide structure and a solvent, and is formed by polymerization in said battery, and a thickness of said battery is not greater than 2 mm.

2. A lithium polymer secondary battery according to claim 1, wherein a ratio of a discharge capacity of said battery to an overlapping area of said positive electrode and said negative electrode (discharge capacity/overlapping area) is not greater than 0.15 mAh/mm$^2$.

3. A lithium polymer secondary battery according to claim 1, wherein two or more of said basic battery cells are layered in said can to contact each other at an outer surface of each U-shaped electrode.

4. A lithium polymer secondary battery according to claim 2, wherein two or more of said basic battery cells are layered in said can to contact each other at an outer surface of each U-shaped electrode.

5. A lithium polymer secondary battery according to claim 1, wherein a fine porous film is further placed between said positive electrode and said negative electrode.

6. A lithium polymer secondary battery according to claim 2, wherein a fine porous film is further placed between said positive electrode and said negative electrode.

7. A lithium polymer secondary battery according to claim 3, wherein a fine porous film is further placed between said positive electrode and said negative electrode.

8. A lithium polymer secondary battery according to claim 4, wherein a fine porous film is further placed between said positive electrode and said negative electrode.

9. A lithium polymer secondary battery according to claim 5, wherein said fine porous film includes at least a layer of polypropylene.

10. A lithium polymer secondary battery according to claim 6, wherein said fine porous film includes at least a layer of polypropylene.

11. A lithium polymer secondary battery according to claim 7, wherein said fine porous film includes at least a layer of polypropylene.

12. A lithium polymer secondary battery according to claim 8, wherein said fine porous film includes at least a layer of polypropylene.

13. A lithium polymer secondary battery according to claim 1, wherein said solvent of said polymer electrolyte comprises a five or six-membered heterocyclic compound having at least oxygen, sulfur or nitrogen as a ring member.

14. A lithium polymer secondary battery according to claim 1, wherein said polymer of said polymer electrolyte is prepared from a monomer selected from the group consisting of a monomer including a polyethylene oxide chain, a monomer including a polypropylene oxide chain and an acrylate monomer having both a polyethylene oxide chain and a polypropylene oxide chain.

15. A lithium polymer secondary battery according to claim 14, wherein said monomer is selected from the group consisting of polyethyleneglycol methacrylate, polyethyleneglycol acrylate and polyethylene diacrylate.

16. A lithium polymer secondary battery according to claim 1, wherein said polymer electrolyte is prepared by polymerization after a monomer for preparation of said polymer, a solute, said solvent and an initiator are injected into said can, and said can is sealed.

17. A lithium polymer secondary battery according to claim 16, wherein said initiator is selected from the group consisting of t-butyl peroxyoxtoate, benzophenone, methyl orthobenzoylbenzoate, benzoyl peroxide and azobisisobutyronitrile.

18. A lithium polymer secondary battery according to claim 16, wherein an amount of said initiator is about 5000 ppm.

19. A lithium polymer secondary battery according to claim 16, wherein said solute is selected from the group consisting of lithium trifluoromethanesulfonate (LiCF$_3$SO$_3$), lithium hexafluorophosphate (LiPF$_6$), lithium tetrafluoroborate (LiBF$_4$) and lithium perchlorate (LiClO$_4$).

20. A lithium polymer secondary battery according to claim 1, wherein said polymer electrolyte is a gel.

21. A lithium polymer secondary battery according to claim 1, wherein said solvent of said polymer electrolyte includes at least one of propylene carbonate, ethylene carbonate, γ-butyrolactone, butylene carbonate, 1,2-dimethoxy ethane, dimethyl carbonate and diethyl carbonate.

22. A lithium polymer secondary battery according to claim 1, wherein said positive electrode contains a metal oxide containing at least one of manganese, cobalt, nickel, vanadium and niobium as a positive electrode active material.

23. A lithium polymer secondary battery according to claim 1, wherein said negative electrode contains a negative electrode active material selected from the group consisting of lithium metal, an alloy which can occlude or release lithium ion, a metal oxide and a carbon material.

24. A lithium polymer secondary battery according to claim 23, wherein said alloy which can occlude or release lithium ion is selected from the group consisting of Li—Al alloy, Li—In alloy, Li—Sn alloy, Li—Pb alloy, Li—Bi alloy, Li—Ga alloy, Li—Sr alloy, Li—Si alloy, Li—Zn alloy, Li—Cd alloy, Li—Ca alloy and Li—Ba alloy.

25. A lithium polymer secondary battery according to claim 23, wherein said carbon material is selected from the group consisting of natural graphite, artificial graphite and amorphous carbon.

* * * * *